United States Patent
Tauchi et al.

(10) Patent No.: US 7,027,720 B2
(45) Date of Patent: Apr. 11, 2006

(54) MAGNETIC TAPE RECORDING APPARATUS AND METHOD, MAGNETIC TAPE READING APPARATUS AND METHOD, RECORDING MEDIUM USED THEREWITH, AND FORMAT FOR MAGNETIC TAPE

(75) Inventors: Yoichiro Tauchi, Saitama (JP); Takuji Himeno, Chiba (JP); Toshitaka Yoshihiro, Kanagawa (JP); Takuro Enomoto, Tokyo (JP)

(73) Assignee: Sony Corporation, Tokyo (JP)

( * ) Notice: Subject to any disclaimer, the term of this patent is extended or adjusted under 35 U.S.C. 154(b) by 1079 days.

(21) Appl. No.: 09/817,515

(22) Filed: Mar. 26, 2001

(65) Prior Publication Data

US 2001/0036357 A1    Nov. 1, 2001

(30) Foreign Application Priority Data

Mar. 27, 2000    (JP)    ............................. 2000-085484

(51) Int. Cl.
*H04N 7/26*    (2006.01)
(52) U.S. Cl. ...................................... 386/112; 386/124
(58) Field of Classification Search ................. 386/46, 386/95, 96, 111, 112, 54, 103, 67, 124; 360/48
See application file for complete search history.

(56) References Cited

U.S. PATENT DOCUMENTS

| | | | | |
|---|---|---|---|---|
| 5,426,538 A | * | 6/1995 | Kanota et al. | 360/48 |
| 5,574,570 A | * | 11/1996 | Ohkuma et al. | 386/103 |
| 5,940,016 A | * | 8/1999 | Lee | 341/67 |
| 6,026,212 A | * | 2/2000 | Oguro | 386/67 |
| 6,115,537 A | * | 9/2000 | Yamada et al. | 386/109 |
| 6,658,195 B1 | * | 12/2003 | Senshu et al. | 386/54 |

* cited by examiner

*Primary Examiner*—Huy Nguyen
(74) *Attorney, Agent, or Firm*—Frommer Lawrence & Haug LLP; William S. Frommer; Paul A. Levy (57) ABSTRACT

A magnetic tape recording apparatus uses a rotary head to record digital data on a magnetic tape. The magnetic tape recording apparatus includes a first acquisition unit for acquiring a first group of data including video data, audio data, or search data, a second acquisition unit for acquiring a second group of data including subcode data related to the first group of data, a synthesizing unit for synthesizing data by combining the first group of data and the second group of data so that both groups of data are continuous on the tracks of the magnetic tape without being separated, and a supply unit for supplying the synthesized data to the rotary head so that the synthesized data is recorded on the magnetic tape.

9 Claims, 11 Drawing Sheets

| $APT_2$ | $APT_1$ | $APT_0$ | MEANING |
|---|---|---|---|
| 0 | 0 | 0 | CONSUMER DIGITAL VCR |
| 0 | 0 | 1 | RESERVED |
| 0 | 1 | 0 | RESERVED |
| 0 | 1 | 1 | RESERVED |
| 1 | 0 | 0 | RESERVED |
| 1 | 0 | 1 | RESERVED |
| 1 | 1 | 0 | RESERVED |
| 1 | 1 | 1 | NO INFORMATION |

MAGNETIC TAPE RECORDING APPARATUS AND METHOD, MAGNETIC TAPE READING APPARATUS AND METHOD, RECORDING MEDIUM USED THEREWITH, AND FORMAT FOR MAGNETIC TAPE

BACKGROUND OF THE INVENTION

1. Field of the Invention

The present invention relates to magnetic tape recording apparatuses and methods, magnetic tape reading apparatuses and methods, recording media used therewith, and magnetic tape formats. In particular, the present invention relates to a magnetic tape recording apparatus and method for recording high definition (HD) video data on a magnetic tape, a magnetic tape reading apparatus and method for reading HD video data from a magnetic tape, a magnetic tape format for use in the magnetic tape recording apparatus and method and the magnetic tape reading apparatus and method, and a recording medium used therewith.

2. Description of the Related Art

Along with an advanced compression technique, video data can be compressed and recorded on a magnetic tape according to a digital video (DV) system. A format therefor is defined as a DV format for consumer digital videocassette recorders.

Figure 1:
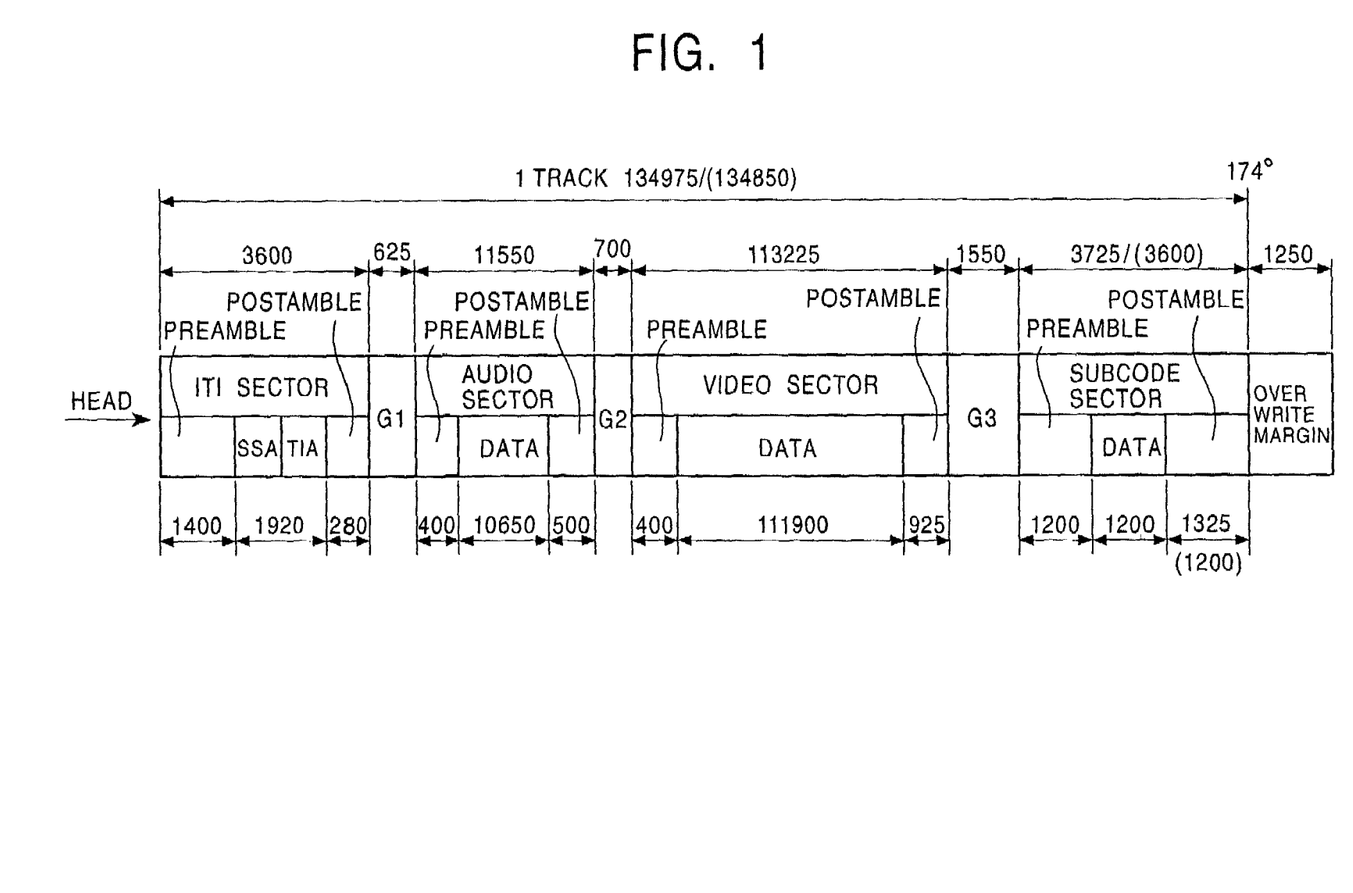
FIG. 1 is an illustration of a track sector according to the DV format.

FIG. 1 shows the configuration of one track of the DV format, which relates to the present invention. In the DV format, video data is recorded after being converted by twenty-four-to-twenty-five (24–25) conversion. The numbers of bits, shown in FIG. 1, indicate values obtained after the 24–25 conversion is performed.

An area of a magnetic tape which corresponds to a winding angle of 174 degrees is used as one substantial track portion. Outside the one track portion, an overwrite margin having a length of 1250 bits is formed. The overwrite margin prevents data from remaining after erasure.

When a rotary head is rotated while synchronizing with a frequency of 60×1000/1001, the one track portion has a length of 134975 bits. When the rotary head is rotated while synchronizing with a frequency of 60 Hz, the one track portion has a length of 134850 bits.

In the one track portion, an insert and track information (ITI) sector, an audio sector, a video sector, and a subcode sector are sequentially arranged in the trace direction (the left-to-right direction in FIG. 1) of the rotary head. A gap G1 is formed between the ITI sector and the audio sector, a gap G2 is formed between the audio sector and the video sector, and a gap G3 is formed between the video sector and the subcode sector.

The ITI sector has a length of 3600 bits, and includes a 1400-bit preamble, and a start sync area (SSA) and a track information area (TIA) which have a length of 1920 bits. In the SSA, a bit string (sync number) necessary for detecting the position of the TIA is provided. In the TIA, information representing the consumer DV format, information representing an SP mode or an LP mode, information representing the pattern of a pilot signal in one frame, etc., are recorded. The TIA is followed by a 280-bit postamble.

The gap G1 has a length of 625 bits.

The audio sector has a length of 11550 bits. Its first 400 bits are used as a preamble, and its last 500 bits are used as a postamble. The intermediate 10650 bits are used as data (audio data).

The gap G2 has a length of 700 bits.

The video sector has a length of 113225 bits. Its first 400 bits are used as a preamble, and its last 925 bits are used as a postamble. The intermediate 111900 bits are used as data (video data).

The gap G3 has a length of 1550 bits.

The subcode sector has a length of 3725 bits when the rotary head is rotated at a frequency of 60×1000/1001 Hz, and has a length-of 3600 bits when the rotary head is rotated at a frequency of 60 Hz. Its first 1200 bits are used as a preamble. In the former case, the last 1325 bits are used as a postamble, and in the latter case, the last 1200 bits are used as a postamble. The intermediate 1200 bits are used as data (subcode).

As described above, in the DV format, a so-called "overhead" is long because the ITI sector, the audio sector, the video sector, and the subcode sector not only have the gaps G1 to G3 thereamong, but also each have a preamble and a postamble, so that a sufficient data-recording rate cannot be obtained.

As a result, in the DV format, a video rate of, at most, approximately 24 Mbps can be ensured which corresponds to MP@HL in the MPEG system although a bit rate of approximately 25 Mbps is required for recording, for example, HD video data. Accordingly, in the DV format, standard definition (SD) video data can be recorded, but HD video data cannot be compressed by MP@HL, MP@H-14, etc., for recording.

SUMMARY OF THE INVENTION

Accordingly, the present invention is made in view of the foregoing circumstances, and it is an object of the present invention to provide a magnetic tape recording apparatus and method for recording HD video data on a magnetic tape, a magnetic tape reading apparatus and method for reading HD video data from a magnetic tape, a magnetic tape format for use in the magnetic tape recording apparatus and method and the magnetic tape reading apparatus and method, and a recording medium used therewith.

To this end, according to an aspect of the present invention, the foregoing object is achieved through provision of a magnetic tape recording apparatus for recording digital data on a magnetic tape by using a rotary head. The magnetic tape recording apparatus includes a first acquisition unit for acquiring a first group of data including video data, audio data, or search data, a second acquisition unit for acquiring a second group of data including subcode data related to the first group of data, a synthesizing unit for synthesizing data by combining the first group of data and the second group of data so that both groups of data are continuous on the tracks of the magnetic tape without being separated, and a supply unit for supplying the synthesized data to the rotary head so that the synthesized data is recorded on the magnetic tape.

Preferably, the first acquisition unit acquires high definition video data as the video data. The first acquisition unit may further include a compression unit for compressing the high definition video data acquired by the first acquisition unit. The synthesizing unit may perform combination processing on the high definition video data compressed by the compression unit.

The compression unit may compress the high definition video data by using MP@HL or MP@H-14 in the MPEG system.

The magnetic tape recording apparatus may further include a third acquisition unit for acquiring compressed standard definition video data. The high definition video data acquired by the first acquisition unit may include identification information for identifying the high definition video data as the standard definition video data. The synthesizing unit may select either the high definition video data compressed by the compression unit or the standard definition video data acquired by the acquisition unit in order to perform combination processing on the selected video data.

According to another aspect of the present invention, the foregoing object is achieved through provision of a magnetic tape recording method for recording digital data on a magnetic tape by using a rotary head. The magnetic tape recording method includes a first acquisition step for acquiring a first group of data including video data, audio data, or search data, a second acquisition step for acquiring a second group of data including subcode data related to the first group of data, a synthesizing step for synthesizing data by combining the first group of data and the second group of data so that both groups of data are continuous on the tracks of the magnetic tape without being separated, and a supply step for supplying the synthesized data to the rotary head so that the synthesized data is recorded on the magnetic tape.

According to a further aspect of the present invention, the foregoing object is achieved through provision of a computer-readable recording medium containing a program for controlling a magnetic tape recording apparatus which records digital data on a magnetic tape by using a rotary head. The program includes a first acquisition step for acquiring a first group of data including video data, audio data, or search data, a second acquisition step for acquiring a second group of data including subcode data related to the first group of data, a synthesizing step for synthesizing data by combining the first group of data and the second group of data so that both groups of data are continuous on the tracks of the magnetic tape without being separated, and a supply step for supplying the synthesized data to the rotary head so that the synthesized data is recorded on the magnetic tape.

According to a more aspect of the present invention, the foregoing object is achieved through provision of a format for use in a magnetic tape having digital data recorded by a rotary head, in which a first group of data including video data, audio data, or search data, and a second group of data including subcode data related to the first group of data are continuously recorded on the tracks of the magnetic tape without being separated.

According to another aspect of the present invention, the foregoing object is achieved through provision of a magnetic tape reading apparatus including a rotary head for reading a magnetic tape on which a first group of data including compressed high definition or standard definition video data, audio data, and search data, and a second group of data including subcode data related to the first group of data are continuously recorded on the tracks of the magnetic tape without being separated, a first decompression unit: for, among the data read from the magnetic tape by the rotary head, decompressing the compressed high definition video data, a second decompression unit for, among the data read from the magnetic tape by the rotary head, decompressing the compressed standard definition video data, a detection unit for, from the data read from the magnetic tape by the rotary head, detecting identification information for identifying either the high definition video data or the standard definition video data, and a selection unit for selectively controlling, based on the result of detection by the detection unit, one of the first decompression unit and the second decompression unit to process the data read from the magnetic tape by the rotary head.

Preferably, the first decompression unit decompresses the high definition video data by using MP@HL or MP@H-14 in the MPEG system, and the second decompression unit decompresses the standard definition video data by using the digital visual format.

According to another aspect of the present invention, the foregoing object is achieved through provision of a magnetic tape reading method for a magnetic tape reading apparatus for reading, by a rotary head, a magnetic tape on which a first group of data including compressed high definition or standard definition video data, audio data, and search data, and a second group of data including subcode data related to the first group of data are continuously recorded on the tracks of the magnetic tape without being separated. The magnetic tape reading method includes a first decompression step for, among the data read from the magnetic tape by the rotary head, decompressing the compressed high definition video data, a second decompression step for, among the data read from the magnetic tape by the rotary head, decompressing the compressed standard definition video data, a detection step for, from the data read from the magnetic tape by the rotary head, detecting identification information for identifying either the high definition video data or the standard definition video data, and a selection step for selectively controlling, based on the result of detection by the detection step, one of the first decompression step and the second decompression step to process the data read from the magnetic tape by the rotary head.

According to another aspect of the present invention, the foregoing object is achieved through provision of a computer-readable recording medium containing a program for controlling a magnetic tape reading apparatus which uses a rotary head to read a magnetic tape on which a first group of data including compressed high definition or standard definition video data, audio data, and search data, and a second group of data including subcode data related to the first group of data are continuously recorded on the tracks of the magnetic tape without being separated. The program includes a first decompression step for, among the data read from the magnetic tape by the rotary head, decompressing the compressed high definition video data, a second decompression step for, among the data read from the magnetic tape by the rotary head, decompressing the compressed standard definition video data, a detection step for, from the data read from the magnetic tape by the rotary head, detecting identification information for identifying either the high definition video data or the standard definition video data, and a selection step for selectively controlling, based on the result of detection by the detection step, one of the first decompression step and the second decompression step to process the data read from the magnetic tape by the rotary head.

In a magnetic tape recording apparatus and method, and a recording medium used therewith which are in accordance with the present invention, a first group of data and a second group of data are combined to synthesize data so that both groups of data are continuous on the tracks of a magnetic tape without being separated, and the synthesized data is supplied to a rotary head, and is recorded on the magnetic tape.

In a magnetic tape format of the present invention, a first group of data and a second group of data are recorded so as to be continuous on the tracks of a magnetic tape without being separated.

In a magnetic tape reading apparatus and method, and a recording medium used therewith which are in accordance with the present invention, based on the result of detection of identification information that identifies either HD video data or SD video data, processing that decompresses data read from a magnetic tape is selected.

According to the present invention, by synthesizing data in which a first group of data and a second group of data are combined so that both groups of data are continuous on the tracks of a magnetic tape without being separated, and supplying the synthesized data to a rotary head, large amount data, such as HD video signal data, can be recorded on the magnetic tape in digital form.

According to the present invention, a first group of data and a second group of data are recorded on the tracks of a magnetic tape so that both groups of data are continuous without being separated, whereby a magnetic tape that contains large amount data such as HD video signal data is realized.

According to the present invention, by detecting identification information for identifying either HD video data and SD video data, and processing data read from a magnetic tape in accordance with the result of the detection, not only SD video data but also HD video data can be securely read.

DESCRIPTION OF THE PREFERRED EMBODIMENTS

Figure 2:
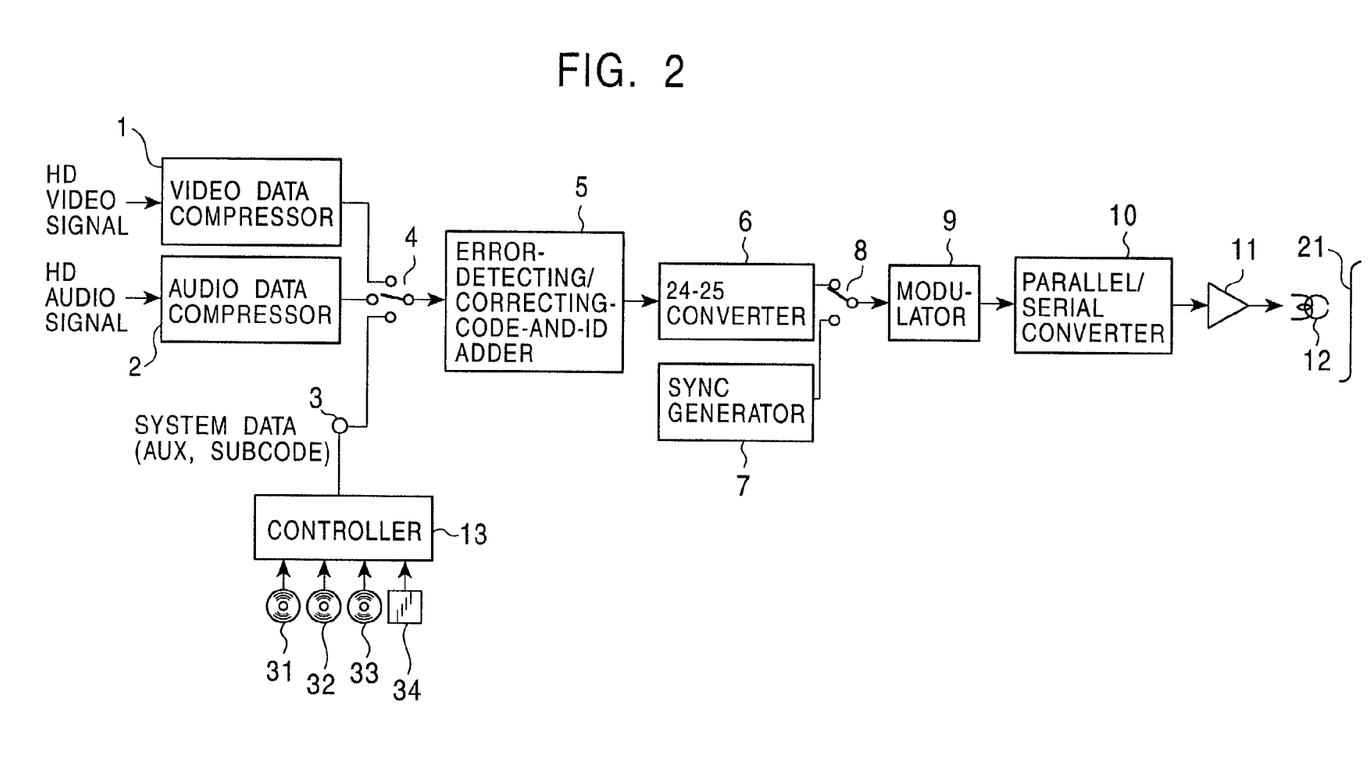
FIG. 2 is a block diagram showing an example of a recording system in a magnetic tape recording/reading apparatus to which the present invention is applied.

FIG. 2 shows an example of a recording system in a magnetic tape recording/reading apparatus to which the present invention is applied. In the magnetic tape recording/reading apparatus, a video data compressor 1 compresses an input HD video signal by the MPEG system such as MP@HL or MP@H-14. An audio data compressor 2 compresses an audio signal corresponding to the HD video signal by, for example, audio compression in the MPEG system. System data including auxiliary (AUX) data and subcode data is input from a controller 13 to a terminal 3.

A switch 4 is activated by the controller 13 so that an output from the video data compressor 1, an output from the audio data compressor 2, or the system data from the terminal 3 is selected with predetermined timing and is supplied to an error-detecting/correcting-code-and-ID adder 5. The error-detecting/correcting-code-and-ID adder 5 adds an error detecting or correcting code or an identification (ID) to the input data. The error-detecting/correcting-code-and-ID adder 5 also processes the input data so that interleaving among sixteen tracks is performed, and outputs the processed data to the 24–25 converter 6. The 24–25 converter 6 converts input 24-bit-unit data into 25-bit-unit data by adding one redundant bit to the input data so that a tracking pilot-signal component strongly appears.

A synchronization (sync) generator 7 generates sync data, and preamble and postamble data. The sync data, and preamble and postamble data are added to main data (shown in FIG. 9) and a subcode (shown in FIG. 10), which are described later.

Under control of the controller 13, a switch 8 selects either of the output of the 24–25 converter 6 and the output of the sync generator 7, and outputs the selected output to a modulator 9. The modulator 9 randomizes the data input via the switch 8 in order to prevent the sequential appearance of ones and zeroes. The modulator 9 also modulates the input data by a method which is adapted for recording on the magnetic tape 21 and which is identical to that used in the DV format, and supplies the modulated data to a parallel/serial converter 10.

The parallel/serial converter 10 converts the input data from parallel form into serial form. An amplifier 11 amplifies data from the parallel/serial converter 10, and supplies the amplified data to a rotary head 12 that is provided on a rotary drum (not shown) so that the data is recorded on the magnetic tape 21.

Figure 3:
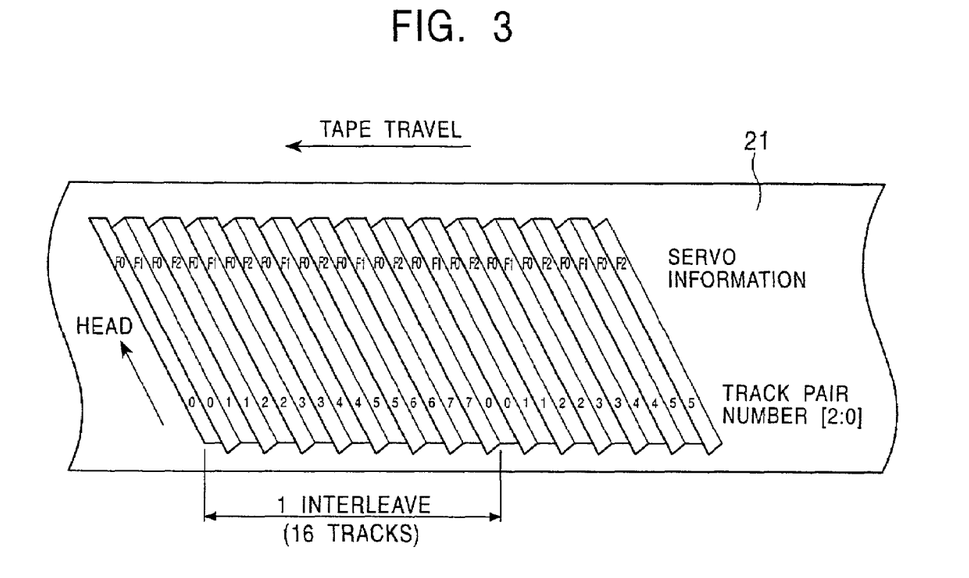
FIG. 3 is an illustration of the track format of the magnetic tape shown in FIG. 2.

FIG. 3 shows the format of tracks formed on the magnetic tape 21 by the rotary head 12. The rotary head 12 traces the magnetic tape 21 from the bottom right to the top left in FIG. 3. This forms tracks that are inclined to the longitudinal direction of the magnetic tape 21. The magnetic tape 21 travels from the right to the left in FIG. 3.

The type of each track is one of the types, F0, F1, and F2 in accordance with the type of a tracking-control pilot signal that is recorded on the track. The tracks are formed in the order of F0, F1, F0, F2, F0, F1, F0, and F2.

Figure 4:
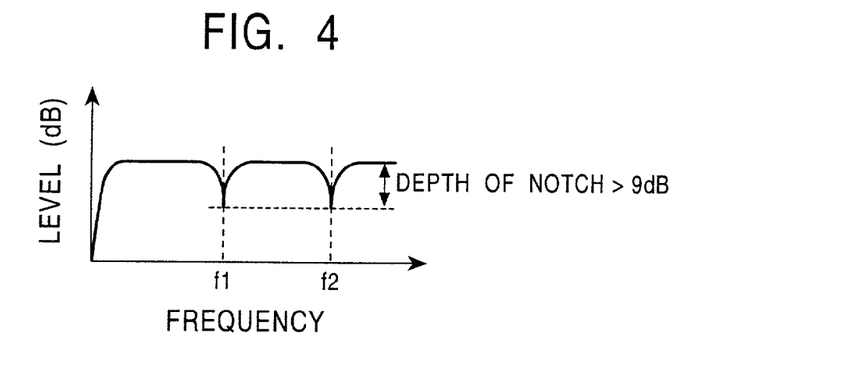
FIG. 4 is a graph illustrating a tracking pilot signal recorded on the tracks shown in FIG. 3.
Figure 5:
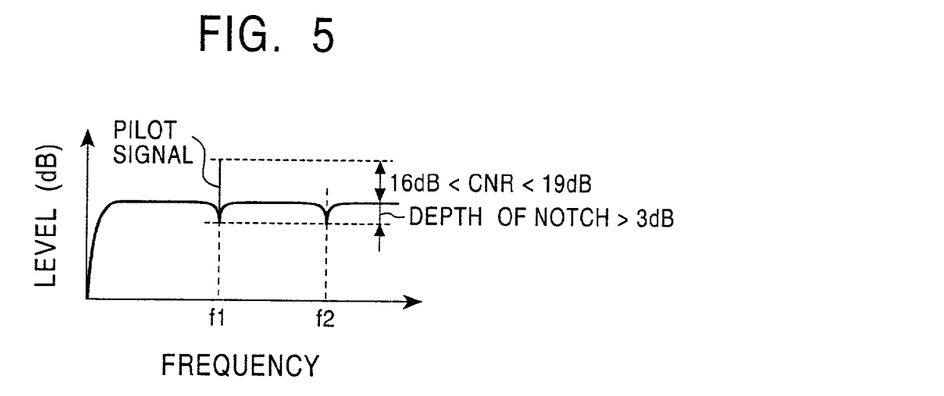
FIG. 5 is a graph illustrating a tracking pilot signal recorded on the tracks shown in FIG. 3.
Figure 6:
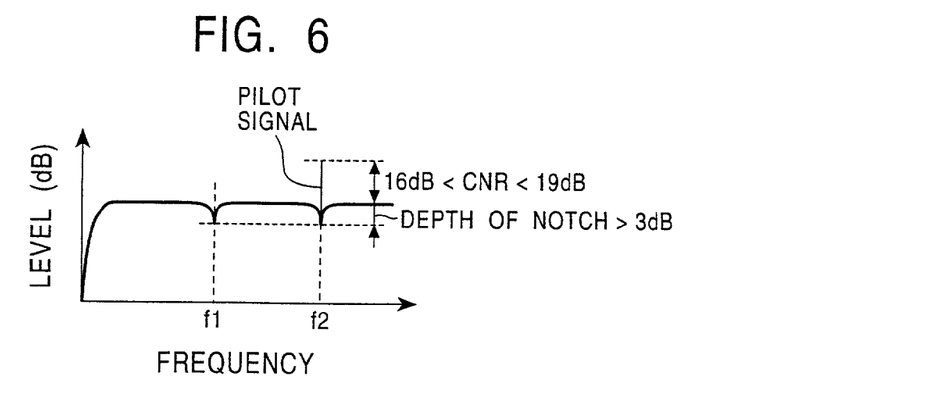
FIG. 6 is a graph illustrating a tracking pilot signal recorded on the tracks shown in FIG. 3.

On the track F0, no pilot signal having either frequency f1 or f2 is recorded, as shown in FIG. 4. Conversely, on the track F1, a pilot signal having frequency f1 is recorded, as shown in FIG. 5, and on the track F2, a pilot signal having frequency f2 is recorded, as shown in FIG. 6.

Frequencies f1 and f2 are set at $\frac{1}{90}$ and $\frac{1}{60}$ of a channel bit recording frequency, respectively.

As shown in FIG. 4, the notches of frequencies f1 and f2 each have a depth of 9 dB. In the cases of the tracks F1 and F2, the carrier-to-noise (CNR) of frequency f1 or f2 is greater than 16 dB and less than 19 dB, as shown in FIGS. 5 and 6. The depth of the notch of frequency f1 or f2 is greater than 3 dB.

A track pattern having the above-described frequency characteristics is similar to that in the DV format. Accordingly, magnetic tapes, rotary heads, driving systems, demodulation systems, and control systems in consumer video tape recorders can be directly used also in this embodiment.

A tape speed and a track pitch are recorded similarly to those in the DV format.

Figure 7:
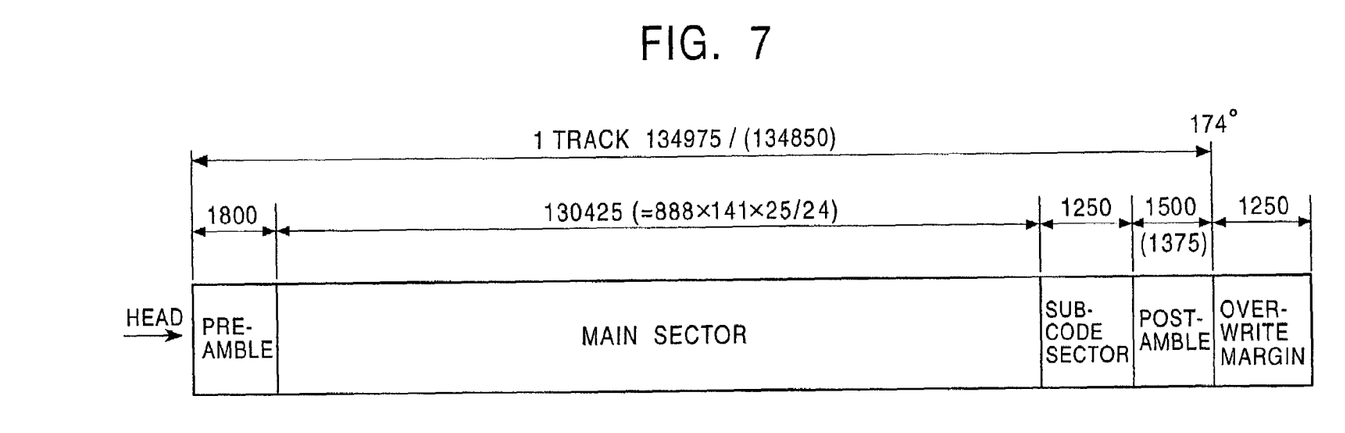
FIG. 7 is an illustration of an arrangement of sectors in each of the tracks shown in FIG. 3.

FIG. 7 shows an example of an arrangement of sectors in each track. In FIG. 7, the number of bits in each sector is indicated by a length obtained after performing the 24–25 conversion. One track has a length of 134975 bits when the rotary head 12 is rotated at a frequency of 60×1000/1001 Hz, and has a length of 134850 bits when the rotary head 12 is rotated at a frequency of 60 Hz. The length of one track corresponds to a winding angle of 174 degrees at which the magnetic tape 21 is wound. After the one track, a 1250-bit overwrite margin is formed. The overwrite margin prevents data from remaining after erasure.

Figure 8:
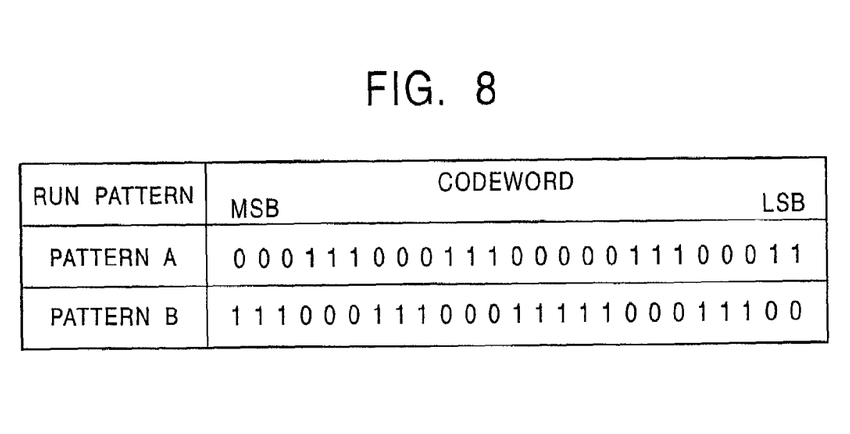
FIG. 8 is an illustration of the patterns of the preamble and postamble shown in FIG. 7.

In FIG. 7, the rotary head 12 traces the magnetic tape 21 from the left to the right. At the top, a 1800-bit preamble is positioned. In this preamble, clock-generating data having the pattern A and pattern B shown in FIG. 8 are recorded in combination. Patterns A- and B are reverse to each other such that zeroes and ones are reversed. By appropriately combining patterns A and B, the tracking patterns of the tracks F0, F1, and F2 shown in FIGS. 4 to 6 can be formed. The run pattern in FIG. 8 indicates a pattern obtained after the 24–25 converter 6 (FIG. 2) performs the 24–25 conversion.

In FIG. 7, next to the 1800-bit preamble, a main sector having a length of 130425 bits is positioned. The configuration of the main sector is shown in FIG. 9.

Figure 9:
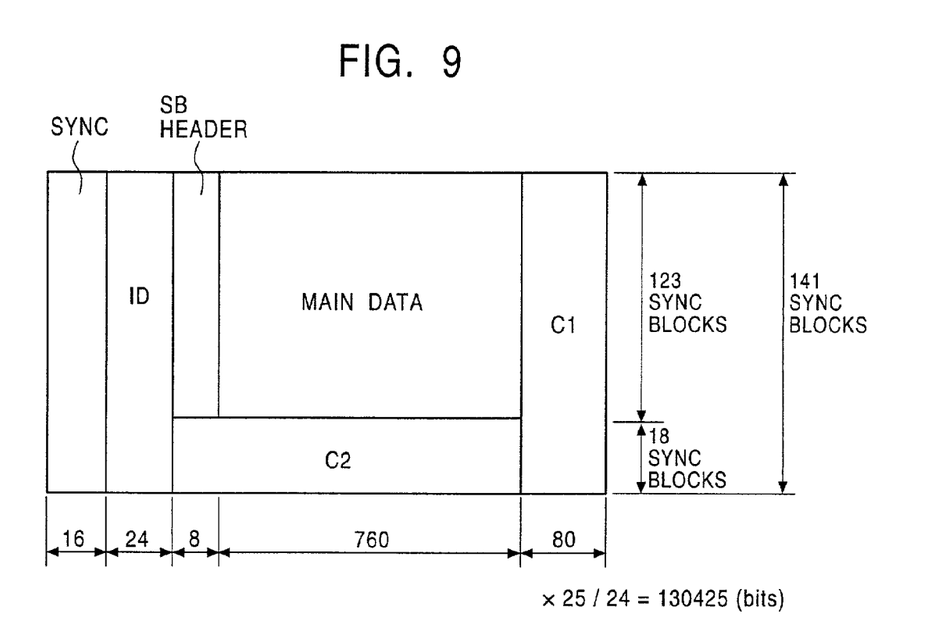
FIG. 9 is an illustration of the configuration of the main sector shown in FIG. 7.

As shown in FIG. 9, the main sector consists of 141 sync blocks. Each sync block has a length of 888 bits (111bytes).

Among the 141 sync blocks, first 123 sync blocks consists of a 16-bit sync (data), a 24-bit ID, an 8-bit sync block (SB) header, 760-bit main data, and an 80-bit parity C1. The sync is generated by the sync generator 7. The ID is added by the error-detecting/correcting-code-and-ID adder 5. The SB header includes identification information for identifying the main data as a type of data among audio data, video data, video data for searching, transport stream data, AUX data, etc. The SB header data is supplied as a type of system data from the terminal 3 to the controller 13.

When the main data is video data, it is supplied from the video data compressor 1. When the main data is audio data, it is supplied from the audio data compressor 2. When the main data is AUX data, it is supplied from the controller 13 via the terminal 3.

For each sync block, based on the ID, the SB header, and the main data, the parity C1 is calculated and is added by the error-detecting/correcting-code-and-ID adder 5.

Among the 141 sync blocks, 18 sync blocks each consist of the sync, the ID, and the parities C2 and C1. The parity C2 is found by vertically calculating the SB header or the main data. This calculation is performed by the error-detecting/correcting-code-and-ID adder 5.

The total data amount of the main sector is 888 bits×141 sync blocks=125208 bits, and the total data amount obtained after performing the 24–25 conversion is 130425 bits. In this case, when the rotary head 12 is rotated while synchronizing with a frequency of 60 Hz, if one frame consists of ten tracks, a substantial maximum data rate is, on average, 760 bits×123 sync blocks×10 tracks×30 Hz=28.044 Mbps. This bit rate is sufficient for recording HD video data according to MP@HL or MP@H-14, compressed audio data, AUX data, and video data for searching.

Figure 10:
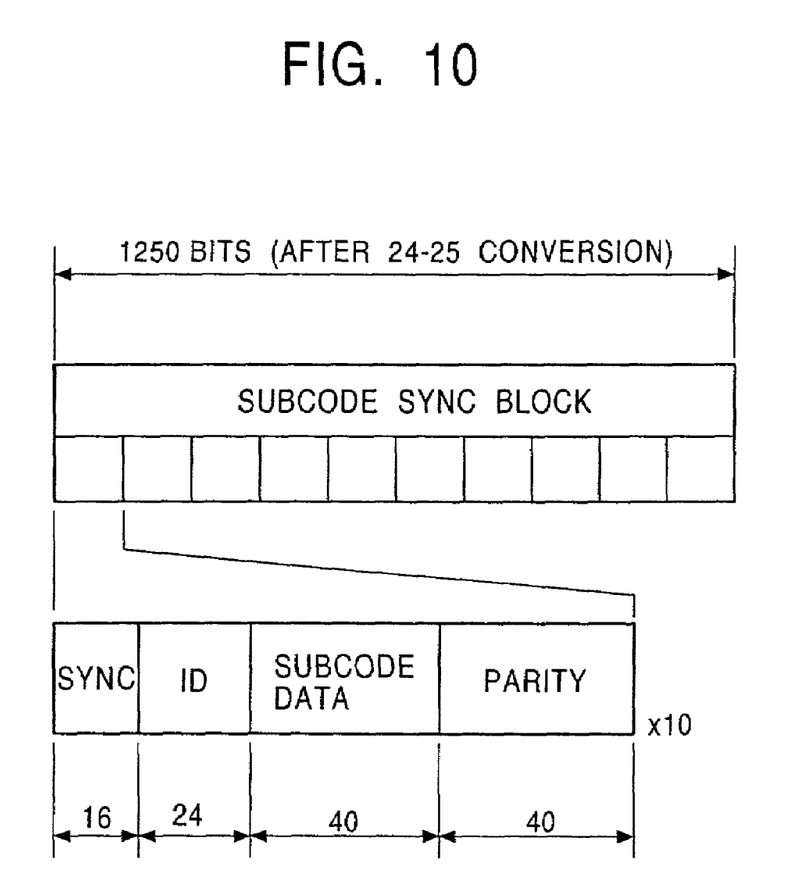
FIG. 10 is an illustration of the configuration of the subcode sector shown in FIG. 7.

Next to the main sector, a 1250-bit subcode sector is positioned. The configuration of the subcode sector is shown in FIG. 10.

The subcode sector for one track consists of ten subcode sync blocks. Each subcode sync block consists of a sync, an ID, subcode data, and a parity.

At the top of each subcode sync block in the subcode sector having 1250 bits (a length obtained after performing the 24–25 conversion), the sync, which has a length of 16 bits, is positioned, and the ID, which has a length of 24 bits, follows in which the lengths are values before performing the 24–25 conversion. The sync is added by the sync generator 7, and the ID is added by the error-detecting/correcting-code-and-ID adder 5.

Next to the ID, 40-bit subcode data is positioned. The subcode data is supplied from the controller 13 via the terminal 3, and includes, for example, a track number and a time code number. After the subcode data, a 40-bit parity is added. The parity is added by the error-detecting/correcting-code-and-ID adder 5.

After the 24–25 conversion is performed, each subcode sync block that has 120 bits before the 24–25 conversion is performed has 125 (=120×25/40) bits.

The subcode sector is followed by a postamble. This postamble is also recorded by combining the patterns A and B in FIG. 8. The length of the postamble is 1500 bits when the rotary head 12 is rotated while synchronizing with a frequency of 60×1000/1001 Hz, and is 1375 bits when the rotary head 12 is rotated while synchronizing with a frequency of 60 Hz.

Next, the operation of the a magnetic tape recording/reading apparatus shown in FIG. 2 is described below.

The HD video signal is input to and compressed by the video data compressor 1 using, for example, MP@HL or MP@H-14, with video data for searching (thumbnail video data). The audio data is input to and compressed by the audio data compressor 2. The controller 13 supplies system data such as subcode data, AUX data, and a header to the terminal 3.

Under control of the controller 13, the switch 4 acquires, with predetermined timing, the video data (including the video data for searching) from the video data compressor 1, the audio data from the audio data compressor 2, or the system data from terminal 3, and outputs them to the error-detecting/correcting-code-and-ID adder 5, whereby they are combined.

The error-detecting/correcting-code-and-ID adder 5 adds a 24-bit ID to each sync block (FIG. 9) of the main sector. For each sync block, the parity C1 (FIG. 9) is calculated and added, and instead of the SB header and the main data, the parity C2 is added to the last 18 sync blocks among the 141 sync blocks.

As shown in FIG. 10, the error-detecting/correctingcode-and-ID adder 5 adds the 24-bit ID to each subcode sync block of the subcode sector. Also, in the error-detecting/correcting-code-and-ID adder 5, a 40-bit parity is calculated and added.

The error-detecting/correcting-code-and-ID adder 5 holds data corresponding to sixteen tracks, and interleaves the data among the sixteen tracks.

The 24–25 converter 6 converts the input data in 24-bit units into data in 25-bit units. By performing the 24–25 conversion, tracking pilot signal components including the frequencies f1 and f2 strongly appear.

The sync generator 7 adds a 16-bit sync to each sync block of the main sector, as shown in FIG. 9. The sync generator 7 adds a 16-bit sync to each subcode sync block, as shown in FIG. 10. The sync generator 7 generates the run pattern (FIG. 8) for the preamble or postamble.

The above-described data addition (combination) is more specifically performed such that the controller 13 controls the switch 8 to perform switching so that data output from the sync generator 7 and data output from the 24–25 converter 6 are appropriately selected and supplied to the modulator 9.

In the modulator 9, the input data is randomized and modulated by a method adapted for the DV format, and the modulated data is output to the parallel/serial converter 10. The parallel/serial converter 10 converts the input data from serial form into parallel form, and supplies the converted data to the rotary head 12 via the amplifier 11. The human resources 12 records the supplied data on the magnetic tape 21.

Figure 11:
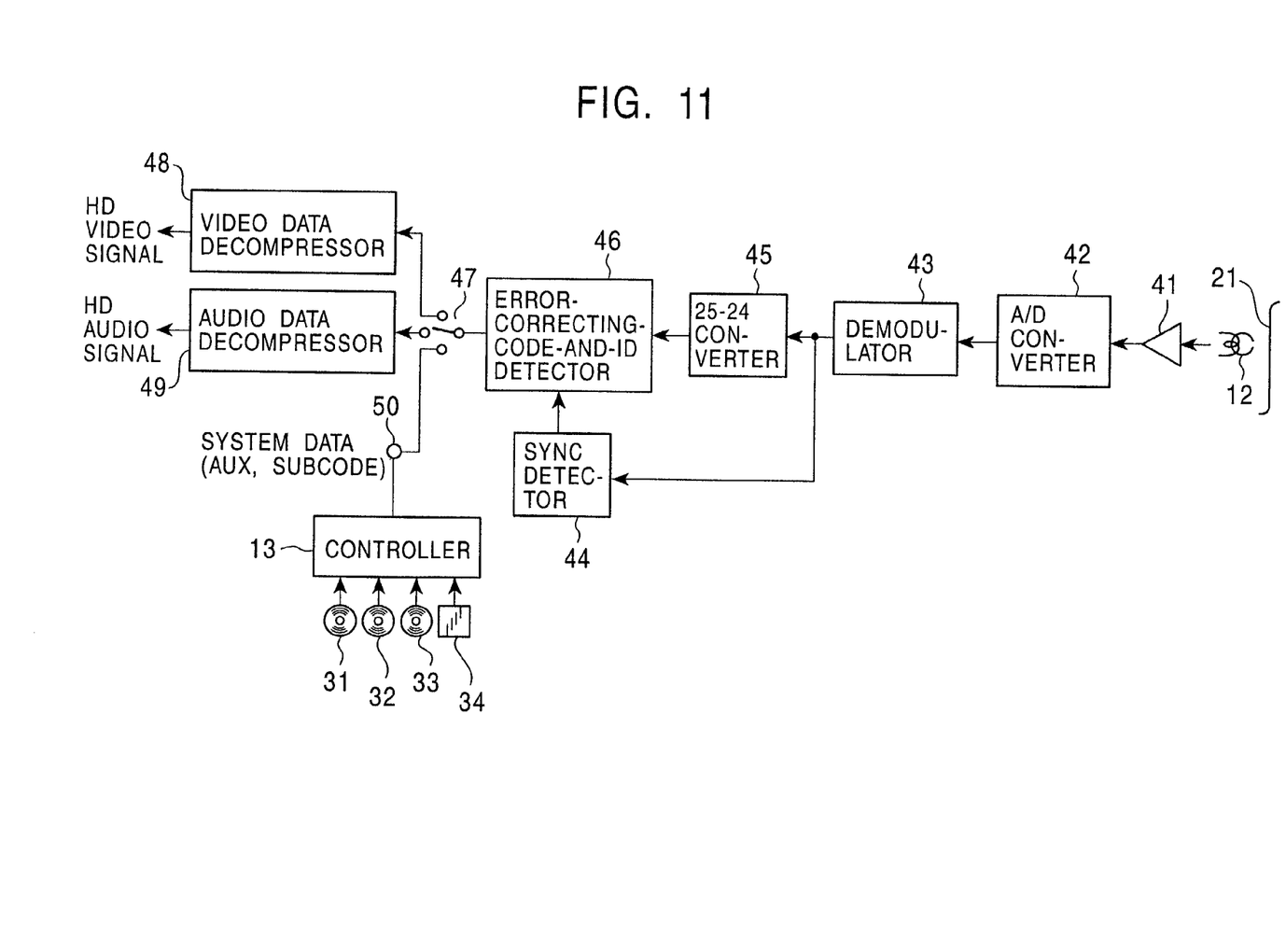
FIG. 11 is a block diagram showing an example of a recording system in the magnetic tape recording/reading apparatus to which the present invention is applied.

FIG. 11 shows an example of a reading system for reading the data recorded on the magnetic tape 21.

The data recorded on the magnetic tape 21 is read and output to an amplifier 41 by the rotary head 12. In the amplifier 41, the input signal is amplified and supplied to an analog-to-digital (A/D) converter 42. In the A/D converter 42, the input signal is converted from analog form to digital form. The digital signal is supplied to a demodulator 43. The demodulator 43 derandomizes the supplied data correspondingly to the randomizing in the modulator 9, and demodulates the supplied data correspondingly to the modulation method used in the modulator 9.

In the sync detector 44, from the data modulated by the demodulator 43, the sync of each sync block in the main sector shown in FIG. 9, and the sync of each sync block in the subcode sector shown in FIG. 10 are detected and supplied to the error-correcting-code-and-ID detector 46. A twenty-five-to-twenty-four (25–24) converter 45 converts; data supplied from the demodulator 43 from 25-bit-unit data to 24-bit-unit data so that the 25–24 conversion corresponds to the conversion by the 24–25 converter 6. The 25–24 converter 45 outputs the converted data to an error-correcting-code-and-ID detector 46.

The error-correcting-code-and-ID detector 46 performs, based on the sync from the sync detector 44, error correction, ID detection, and deinterleaving. Under control of the controller 13, a switch 47 outputs, among the data output from the error-correcting-code-and-ID detector 46, video data (including video data for searching) to a video data decompressor 48, outputs audio data to an audio data decompressor 49, and outputs system data that includes subcode data and AUX data to the controller 13 via a terminal 50.

In the video data decompressor 48, the input video data is decompressed and digital-to-analog-converted, and the converted data is output as an analog video signal. In the audio data decompressor 49, the input audio data is decompressed and digital-to-analog-converted, and the converted data is output as an analog audio signal.

Next, the operation of the reading system is described below.

The data recorded on the magnetic tape 21 is read by the rotary head 12, and is amplified by the amplifier 41. The amplified data is supplied to the A/D converter 42. The data is converted into digital data by the A/D converter 42. The digital data is input to the demodulator 43, and is derandomized and demodulated using a method corresponding to the randomizing and demodulation by the modulator 9 shown in FIG. 2.

An output from the A/D converter 42 is supplied to a servo circuit (not shown). The servo circuit performs tracking control by reading the data of pattern A and the data of pattern B (FIG. 8), which are recorded in the preamble and the postamble, and generating a tracking pilot signal.

The 25–24 converter 45 converts the data demodulated by the demodulated by the demodulator 43 from 25-bit-unit data to 24-bit-unit data, and outputs the converted data to the error-correcting-code-and-ID detector 46.

The sync detector 44 detects the main sector (FIG. 9) or the sync of the subcode sector (FIG. 10) from the data output from the demodulator 43, and supplies them to the error-correcting-code-and-ID detector 46. The error-correcting-code-and-ID detector 46 stores sixteen track data and performs deinterleaving, and performs error correction using the parities C1 and C2 in the main sector shown in FIG. 9. Also, the error-correcting-code-and-ID detector 46 detects the SB header of the main sector, and determines the type of data included in each sync block, among plural types of data such as audio data, video data, AUX data, and video data for searching.

The error-correcting-code-and-ID detector 46 uses the parity in the subcode sync block (FIG. 10) to perform error-correction processing on subcode data. The error-correcting-code-and-ID detector 46 also detects each ID, and determines the type of the subcode data corresponding to the detected ID. Accordingly, it is determined that the subcode data represents a track number or that the subcode data represents a time code number.

Based on the SB header detected by the error-correcting-code-and-ID detector 46, the switch 47 supplies the video data and the video data for searching to the video data decompressor 48. The video data decompressor 48 decompresses the input data by using a method corresponding to the compression method in the video data compressor 1 shown in FIG. 2, and outputs the decompressed data as a video signal.

The switch 47 outputs the audio data to the audio data decompressor 49. The audio data decompressor 49 decompresses the input audio data by using a method corresponding to the compression method in the audio data compressor 2 shown in FIG. 2, and outputs the decompressed data as an audio signal.

The switch 47 also outputs data output from the error-correcting-code-and-ID detector 46, such as AUX data and subcode, from the terminal 50 to the controller 13.

Figure 12:
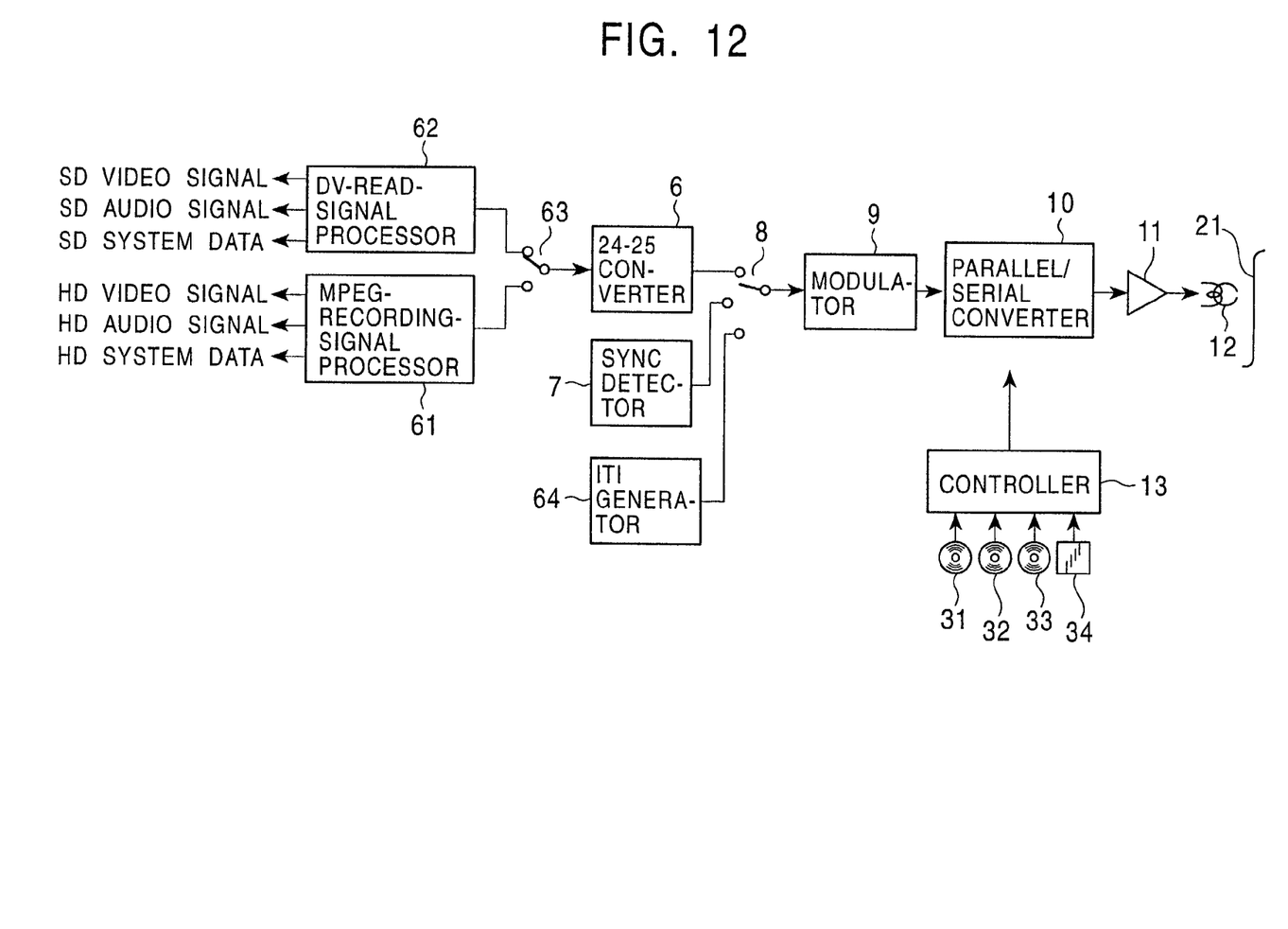
FIG. 12 is a block diagram showing another example of the recording system in the magnetic tape recording/reading apparatus to which the present invention is applied.

FIG. 12 shows a second example of the recording system. In the second example, similarly to the case shown in FIG. 2, an HD video signal and a corresponding audio signal (HD audio signal), and system data (HD system data) can be recorded on the magnetic tape 21 by using the MPEG system. In addition, in the consumer DV format as in the conventional recording, an SD video signal, an SD audio signal, and SD system data can be recorded.

Specifically, the second example, (FIG. 12) includes, an MPEG recording-signal processor 61 that includes a video data compressor 1, an audio data compressor 2, a terminal 3, a switch 4, and an error-detecting/correcting-code-and-ID adder 5 as shown in FIG. 2, and a (consumer) DV recording-signal processor 62. Under control of a controller 13, a switch 63 selects either one of an output from the MPEG recording-signal processor 61 and an output from the DV recording-signal processor 62, and supplies the selected one to a 24–25 converter 6.

The second example (FIG. 12) also includes an insert and track information (ITI) generator 64. The ITI generator 64 generates data of the ITI sector as shown in FIG. 1, and supplies the data to a switch 8. The switch 8 selects one of an output from the 24–25 converter 6, an output from a sync generator 7, and an output from the ITI generator 64, and outputs the selected one to a modulator 9. The other points in configuration are identical to those in the case shown in FIG. 2.

In other words, in the second example, similarly to the case shown in FIG. 2, an HD recording signal and a corresponding HD audio signal, and HD system data are recorded on the magnetic tape 21. The operation of the second example is omitted since it is identical to that in the case shown in FIG. 2. In addition, the DV recording-signal processor 62 performs DV-format signal processing on an input SD signal and a corresponding SD audio signal, and SD system data.

The data output from the DV recording-signal processor 62 is supplied to the 24–25 converter 6 via the switch 63, and is converted from a 24-bit-unit from to a 25-bit-unit form. The switch 8 selects, with predetermined timing, one of an output from the 24–25 converter 6, a sync, a preamble or a postamble that is output from the sync generator 64, and data (the data of the ITI sector shown in FIG. 1) output from the ITI generator 64, and outputs the selected one to the modulator 9. The modulator 9 modulates the input data, and outputs the modulated data to a parallel/serial converter 10 for conversion from parallel form to serial form. The serial data output from the parallel/serial converter 10 is amplified by an amplifier 11, and the amplified data is recorded on the magnetic tape 21 by a rotary head 12.

As described above, on the magnetic tape 21, the data is recorded on a DV format track as shown in FIG. 1.

The error-detecting/correcting-code-and-ID adder 5 (as shown in FIG. 2) of the MPEG recording-signal processor 61 records, in the ID of the main sector (FIG. 9) and in the ID of the subcode sector (FIG. 10), identification information indicating that the presently recorded data is data compressed by the MPEG system.

As the DV recording-signal processor 62, the 24–25 converter 6, the ITI generator 64, the switch 8, the modulator 9, the parallel/serial converter 10, the amplifier 11, and the rotary head 12 (shown in FIG. 12), those used in a conventional consumer DV system can be used without being changed. Among these components, the 24–25 converter 6, the switch 8, the modulator 9, the parallel/serial converter 10, the amplifier 11, and the rotary head 12 can be used in common in cases in which the SD video signal is recorded and in which the HD video signal is recorded.

Figure 13:
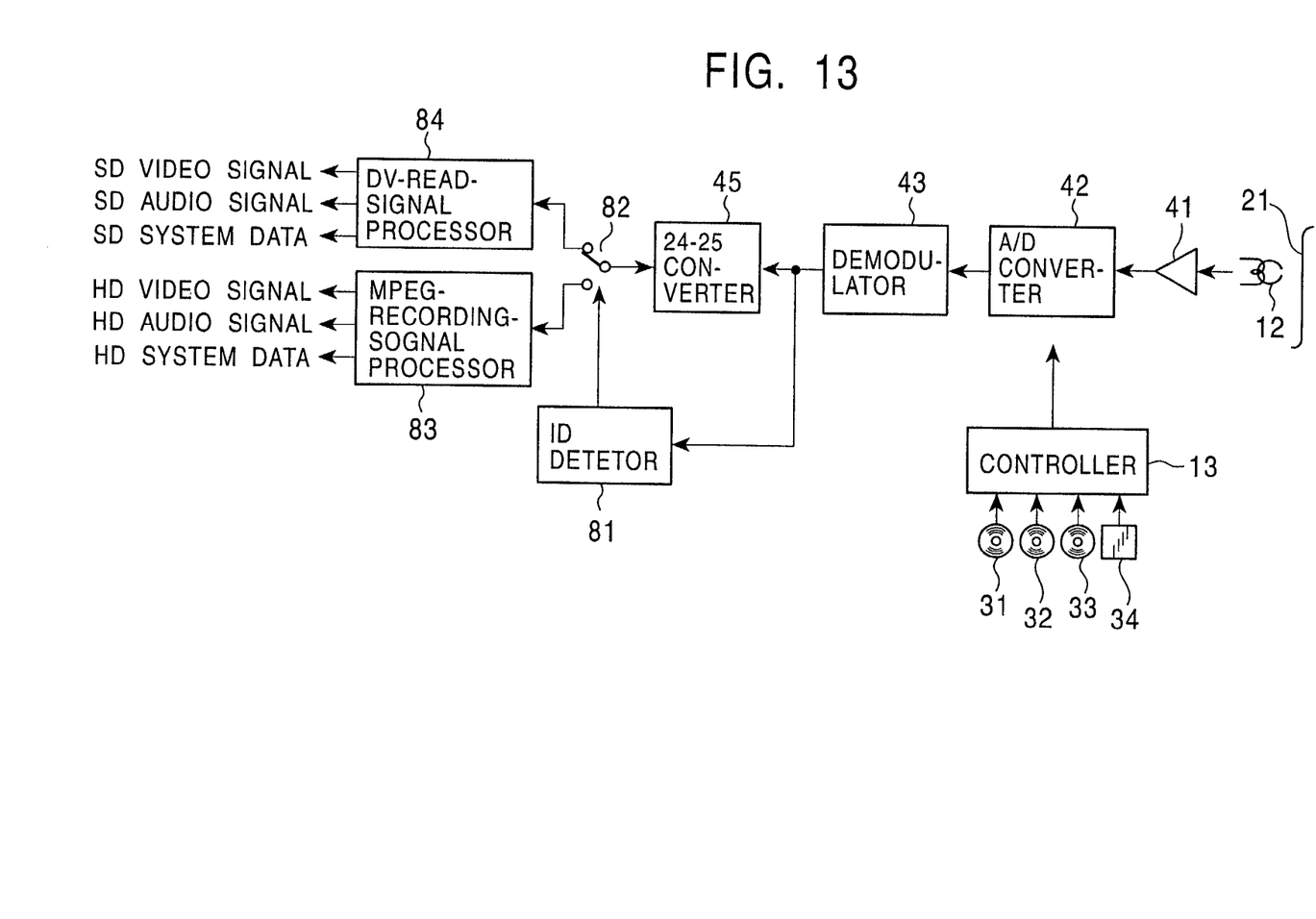
FIG. 13 is an illustration of another example of the recording system in the magnetic tape recording/reading apparatus to which the present invention is applied.
Figure 14:
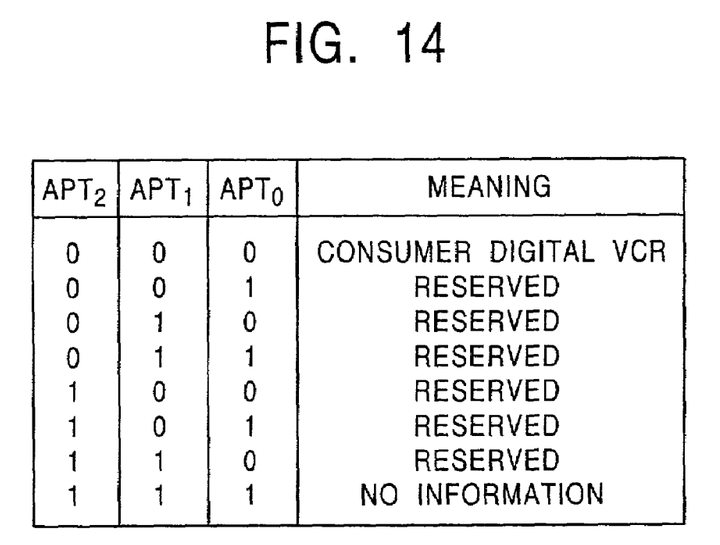
FIG. 14 is an illustration of the configuration of the TIA.

FIG. 13 shows an example of a reading system corresponding to the recording system shown in FIG. 12. In this example, an ID detector 81 detects the ID of the main sector (FIG. 9) or the ID of the subcode sector (FIG. 10), and recognizes that data which is being read is HD video signal data compressed using the MPEG system. The ID detector 81 also detects $APT_2$, $APT_1$, and $APT_0$ that are recorded in the TIA of the ITI sector shown in FIG. 1. As shown in FIG. 14, the values of $APT_2$, $APT_1$, and $APT_0$ are "000" in the consumer digital videocassette recorder. Accordingly, these values make it possible to recognize that data which is being read is SD video signal data according to the consumer DV system.

Based on the recognition result, when HD video signal data is being read, the ID detector 81 switches the switch 82 to be connected to an MPEG-recording-signal processor 83, and allows a 25–24 converter 45 to supply its output to the MPEG-recording-signal processor 83. When SD video signal data is being read, the ID detector 81 switches the switch 82 to be connected to a consumer-DV-read-signal processor 84, and allows the 25–24 converter 45 to supply its output to the consumer-DV-read-signal processor 84.

The MPEG-recording-signal processor 83 includes the sync generator 44, the error-correcting-code-and-ID detector 46, the switch 47, the video data decompressor 48, the audio data compressor 49, and the terminal 50, which are shown in FIG. 11.

The other points in configuration are identical to those in the case shown in FIG. 11.

In other words, in the reading system shown in FIG. 13, based on the data output from the demodulator 43, the ID detector 81 determines whether the read data is MPEG data (HD video signal data) or consumer DV data (SD video signal data). If the read data is MPEG data, the data output from the 25–24 converter 45 is supplied via the switch 82 to and processed in the MPEG-recording-signal processor 83. The processing in this case is similar to that in the case shown in FIG. 11.

Conversely, if the ID detector 81 has determined that the data output from the demodulator 43 is consumer-DV-format data, the ID detector 81 switches the switch 82 so that the output from the 25–24 converter 45 is supplied to the DV-read-signal processor 84. The DV-read-signal processor 84 performs DV-format decompression processing on the input data, and outputs the processed data as an SD video signal, an SD audio signal, and SD system data.

Among the components shown in FIG. 13, the rotary head 12, the amplifier 41, the A/D converter 42, the demodulator 43, and the 25–24 converter 45 can be used-in common in cases in which an SD signal is read and in which an HD video signal is read.

Although the above-described successive processing can be executed by hardware, it may be executed by software. In a case in which software is used to execute the above-described successive processing, programs constituting the software are installed from recording media in a computer that is built into dedicated hardware, or in, for example, a general-purpose personal computer in which various functions can be executed by installing various programs therein.

As shown in FIGS. 2, and 11 to 13, the recording media include package media composed of a magnetic disk 31 (including a floppy disk), an optical disk 32 (including a compact-disk read-only memory and a digital versatile disk), a magneto-optical disk 33 (including a Mini-Disk), and a semiconductor memory 34, which are distributed separately from the magnetic tape recording/reading apparatus in order to provide the user with programs and which contain the programs. The recording media also include a program-recorded read-only memory or a hard disk that is provided to the user in a form in which it is built into the magnetic tape recording/reading apparatus.

In this Specification, steps that describe each program recorded in the recording media specifically include time-sequential processes that are executed in the order given, and include processes that are executed separately or in parallel although the processes are not sequentially executed.

What is claimed is:

1. A magnetic tape recording apparatus for recording digital data on a magnetic tape by using a rotary head, comprising:

first acquisition means for acquiring a first group of data including video data, audio data, or search data, wherein the first group of data has a sector structure of a main data area storing said video data, said audio data, or said search data and a sync block header identifying the type of the main data;

second acquisition means for acquiring a second group of data including subcode data related to said first group of data;

synthesizing means for synthesizing data by combining said first group of data and said second group of data so that both groups of data are continuous on the tracks of said magnetic tape without being separated; and supply means for supplying the synthesized data to said rotary head so that the synthesized data is recorded on said magnetic tape, wherein said first acquisition means acquires high definition video data as said video data;

said first acquisition means further comprises compression means for compressing the high definition video data acquired by said first acquisition means; and said synthesizing means performs combination processing on the high definition video data compressed by said compression means.

2. A magnetic tape recording apparatus according to claim 1, wherein said compression means compresses the high definition video data by using MP@HL or MP@H-14 in the MPEG system.

3. A magnetic tape recording apparatus according to claim 1, further comprising third acquisition means for acquiring compressed standard definition video data, wherein:

the high definition video data acquired by said first acquisition means includes identification information for identifying the high definition video data as the standard definition video data; and said synthesizing means select either the high definition video data compressed by said compression means or the standard definition video data acquired by said acquisition means so that combination processing on the selected video data is performed.

4. A magnetic tape recording method for recording digital data on a magnetic tape by using a rotary head, comprising:

a first acquisition step for acquiring a first group of data including video data, audio data, or search data, wherein the first group of data has a sector structure of a main data area storing said video data, said audio data, or said search data and a sync block header identifying the type of the main data;

a second acquisition step for acquiring a second group of data including subcode data related to said first group of data;

a synthesizing step for synthesizing data by combining said first group of data and said second group of data so that both groups of data are continuous on the tracks of said magnetic tape without being separated; and a supply step for supplying the synthesized data to said rotary head so that the synthesized data is recorded on said magnetic tape, wherein said first acquisition step acquires high definition video data as said video data; and further including a compression step for compressing the high definition video data acquired by said first acquisition step; and said synthesizing step performs combination processing on the high definition video data compressed by said compression step.

5. A computer-readable recording medium containing a program executable by a processor for performing a method for controlling a magnetic tape recording apparatus that records digital data on a magnetic tape by using a rotary head, said method comprising:

first acquisition step for acquiring a first group of data including video data, audio data, or search data, wherein the first group of data has a sector structure of a main data area storing said video data, said audio data, or said search data and a sync block header identifying the type of the main data;

a second acquisition step for acquiring a second group of data including subcode data related to said first group of data;

a synthesizing step for synthesizing data by combining said first group of data and said second group of data so that both groups of data are continuous on the tracks of said magnetic tape without being separated; and a supply step for supplying the synthesized data to said rotary head so that the synthesized data is recorded on said magnetic tape, wherein said first acquisition step acquires high definition video data as said video data; and further including a compression step for compressing the high definition video data acquired by said first acquisition step; and said synthesizing step performs combination processing on the high definition video data compressed by said compression step.

6. A magnetic tape reading apparatus comprising:

a rotary head for reading a magnetic tape on which a first group of data including compressed high definition or standard definition video data, audio data, and search data, and a second group of data including subcode data related to said first group of data are continuously recorded on the tracks of said magnetic tape without being separated;

first decompression means for, among the data read from said magnetic tape by said rotary head, decompressing the compressed high definition video data;

second decompression means for, among the data read from said magnetic tape by said rotary head, decompressing the compressed standard definition video data;

detection means for, from the data read from said magnetic tape by said rotary head, detecting identification information for identifying either the high definition video data or the standard definition video data; and selection means for selectively controlling, based on the result of detection by said detection means, one of said first decompression means and said second decompression means to process the data read from said magnetic tape by said rotary head.

7. A magnetic tape reading apparatus according to claim 6, wherein:

said first decompression means decompresses the high definition video data by using MP@HL or MP@H-14 in the MPEG system; and said second decompression means decompresses the standard definition video data by using the digital visual format.

8. A magnetic tape reading method for a magnetic tape reading apparatus for reading, by a rotary head, a magnetic tape on which a first group of data including compressed high definition or standard definition video data, audio data, and search data, and a second group of data including subcode data related to said first group of data are continuously recorded on the tracks of said magnetic tape without being separated, said magnetic tape reading method comprising:

a first decompression step for, among the data read from said magnetic tape by said rotary head, decompressing the compressed high definition video data;

a second decompression step for, among the data read from said magnetic tape by said rotary head, decompressing the compressed standard definition video data;

a detection step for, from the data read from said magnetic tape by said rotary head, detecting identification information for identifying either the high definition video data or the standard definition video data; and a selection step for selectively controlling, based on the result of detection by said detection step, one of said first decompression step and said second decompression step to process the data read from said magnetic tape by said rotary head.

9. A computer-readable recording medium containing a program executable by a processor for performing a method for controlling a magnetic tape reading apparatus that uses a rotary head to read a magnetic tape on which a first group of data including compressed high definition or standard definition video data, audio data, and search data, and a second group of data including subcode data related to said first group of data are continuously recorded on the tracks of said magnetic tape without being separated, said method comprising:

a first decompression step for, among the data read from said magnetic tape by said rotary head, decompressing the compressed high definition video data;

a second decompression step for, among the data read from said magnetic tape by said rotary head, decompressing the compressed standard definition video data;

a detection step for, from the data read from said magnetic tape by said rotary head, detecting identification information for identifying either the high definition video data or the standard definition video data; and a selection step for selectively controlling, based on the result of detection by said detection step, one of said first decompression step and said second decompression step to process the data read from said magnetic tape by said rotary head.

* * * * *